US007919939B2

(12) United States Patent
Mosbrucker

(10) Patent No.: US 7,919,939 B2

(45) Date of Patent: Apr. 5, 2011

(54) REMOTE VERTICAL BLIND OPENING AND CLOSING SYSTEM

(75) Inventor: Rick Mosbrucker, Templeton, CA (US)

(73) Assignee: Rick Mosbrucker, Templeton, CA (US)

( * ) Notice: Subject to any disclaimer, the term of this patent is extended or adjusted under 35 U.S.C. 154(b) by 359 days.

(21) Appl. No.: 12/150,883

(22) Filed: Apr. 30, 2008

(65) Prior Publication Data

US 2009/0273307 A1 Nov. 5, 2009

(51) Int. Cl.
*G05D 1/02* (2006.01)
*H04Q 9/00* (2006.01)

(52) U.S. Cl. .......... 318/16; 318/266; 318/280; 318/466; 160/176.1 P

(58) Field of Classification Search .................... 318/16, 318/266, 466, 280, 283; 160/176.1 P, 170, 160/331, 310
See application file for complete search history.

(56) References Cited

U.S. PATENT DOCUMENTS

| | | | | |
|---|---|---|---|---|
| 4,712,104 | A | 12/1987 | Kobayashi | |
| 4,914,360 | A * | 4/1990 | Hsieh et al. | 318/16 |
| 5,848,634 | A * | 12/1998 | Will et al. | 160/310 |
| 6,100,659 | A * | 8/2000 | Will et al. | 318/466 |
| 6,201,364 | B1 * | 3/2001 | Will et al. | 318/466 |
| 6,598,652 | B1 * | 7/2003 | Montesinos Alonso | 160/331 |
| 6,644,376 | B2 * | 11/2003 | Wielen | 160/170 |
| 2003/0188836 | A1 * | 10/2003 | Whiting | 160/176.1 P |
| 2005/0189078 | A1 * | 9/2005 | Whiting | 160/176.1 P |

* cited by examiner

*Primary Examiner* — Paul Ip

(57) ABSTRACT

A remote blind actuating system for use in opening and closing blinds with a string incorporates a motor, a pulley, a receiver, and a housing. The motor, the pulley, and the receiver are disposed within the housing. The motor is connected with the pulley and is in communication with the receiver. The pulley is an cylindrical member with a first distal end and a second distal end. The pulley is rotatably affixed to the motor about an axis. The first distal end of the pulley is connected with the motor and the second distal end is connected with the string.

1 Claim, 14 Drawing Sheets

REMOTE VERTICAL BLIND OPENING AND CLOSING SYSTEM

FIELD OF THE INVENTION

The present invention relates with a system and apparatus for opening and closing window blinds which use vertical strings.

BACKGROUND OF THE INVENTION

In most buildings one can find at least one window which is accompanied by either horizontal blinds or vertical blinds. These blinds serve to insulate a room from heat and unwanted UV radiation and to obscure the contents therein. They also allow for a relaxed atmosphere when occupied by opening and thereby allowing sunlight to shine through.

One of the encumbrances encountered with some blinds is that they must be turned open or shut. For instance, when a person would like to view a movie within their home, it is desirable to close the blinds to allow for optimum viewing pleasure. For some people, getting up and manually closing the blinds can be an annoyance. In other cases, the blinds may be out of reach for those who suffer from various ailments which may limit their mobility.

For these reasons, there is a need in the marketplace for an external remote blind operating system. Although there exist various blind systems which also incorporate a remote actuating system with blinds, there are no external remote blind operating systems in the marketplace specifically made for the purpose of retrofitting various blind systems for remote control activation. This remote blind operating system can be used for various types of window blinds through the use of a remote control.

SUMMARY OF THE INVENTION

It is an object of the present invention to provide a system and apparatus for opening and closing blinds remotely. This system is an external unit designed for the purpose of retrofitting blind systems for the purpose of enabling remote activation. The system and apparatus will enable a user to open and close blinds completely open, completely shut, and any intermediate position to modulate the amount of light to come through the window.

It is an object of the present invention to provide for a compact system and apparatus for the purpose of being discreetly affixed to the blinds so as not to affect the aesthetics of the blinds.

BRIEF DESCRIPTION OF THE DRAWING FIGURES

DESCRIPTION OF PREFERRED EMBODIMENTS

Figure 1A:
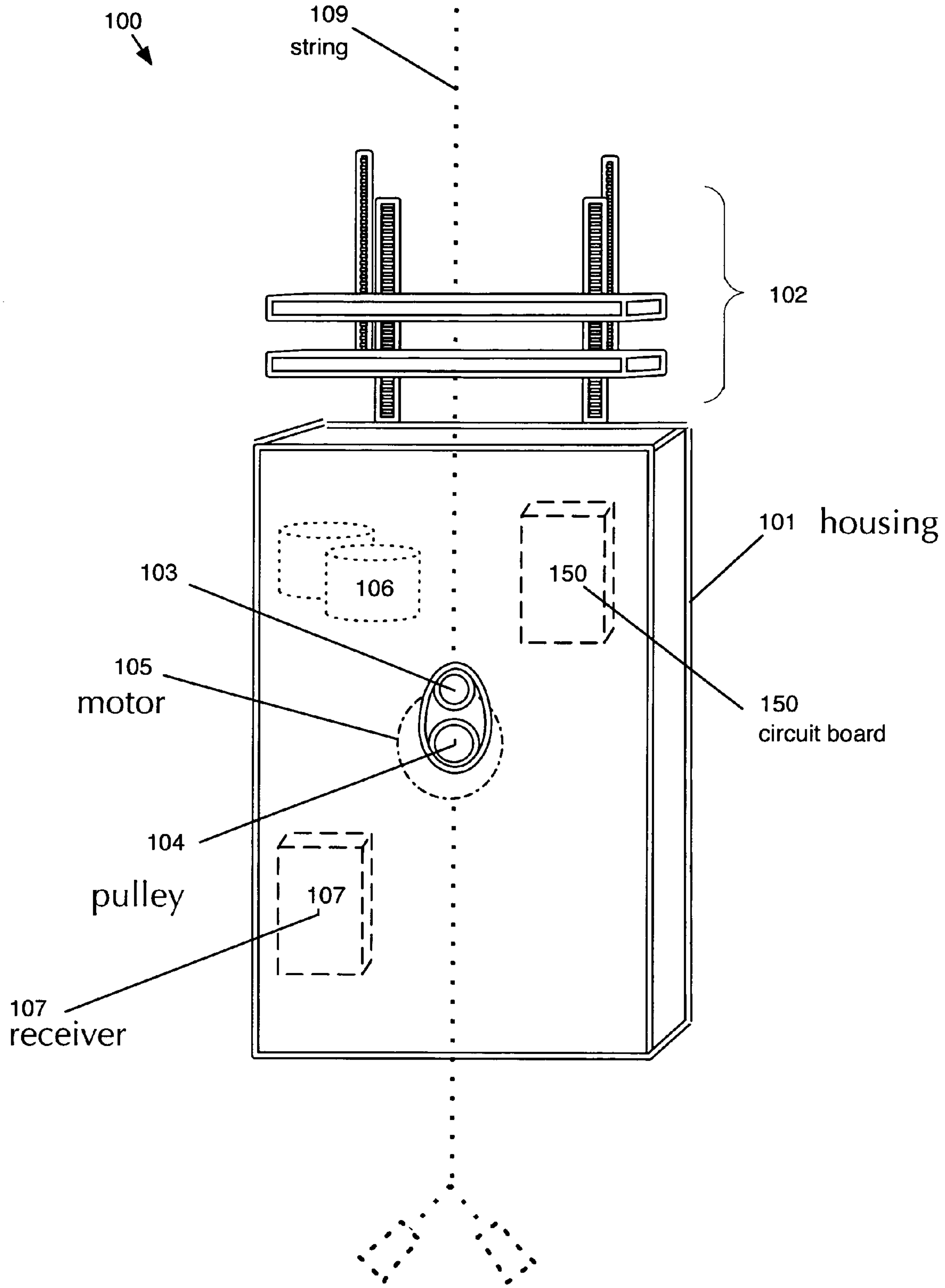
FIG. 1A is a perspective view of a preferred embodiment of the present invention.
Figure 1B:
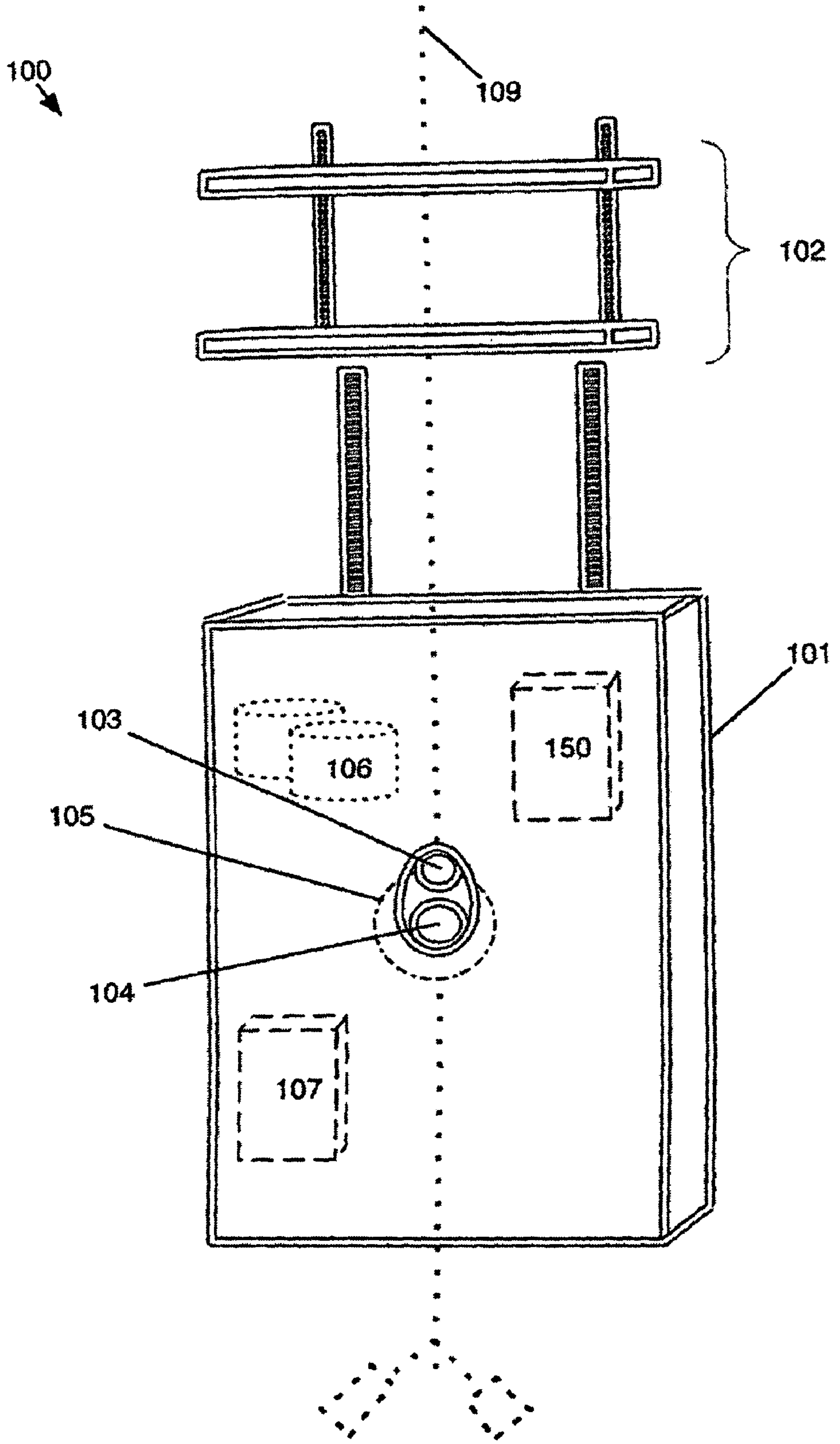
FIG. 1B is a frontal view of a preferred embodiment of the present invention.
Figure 1C:
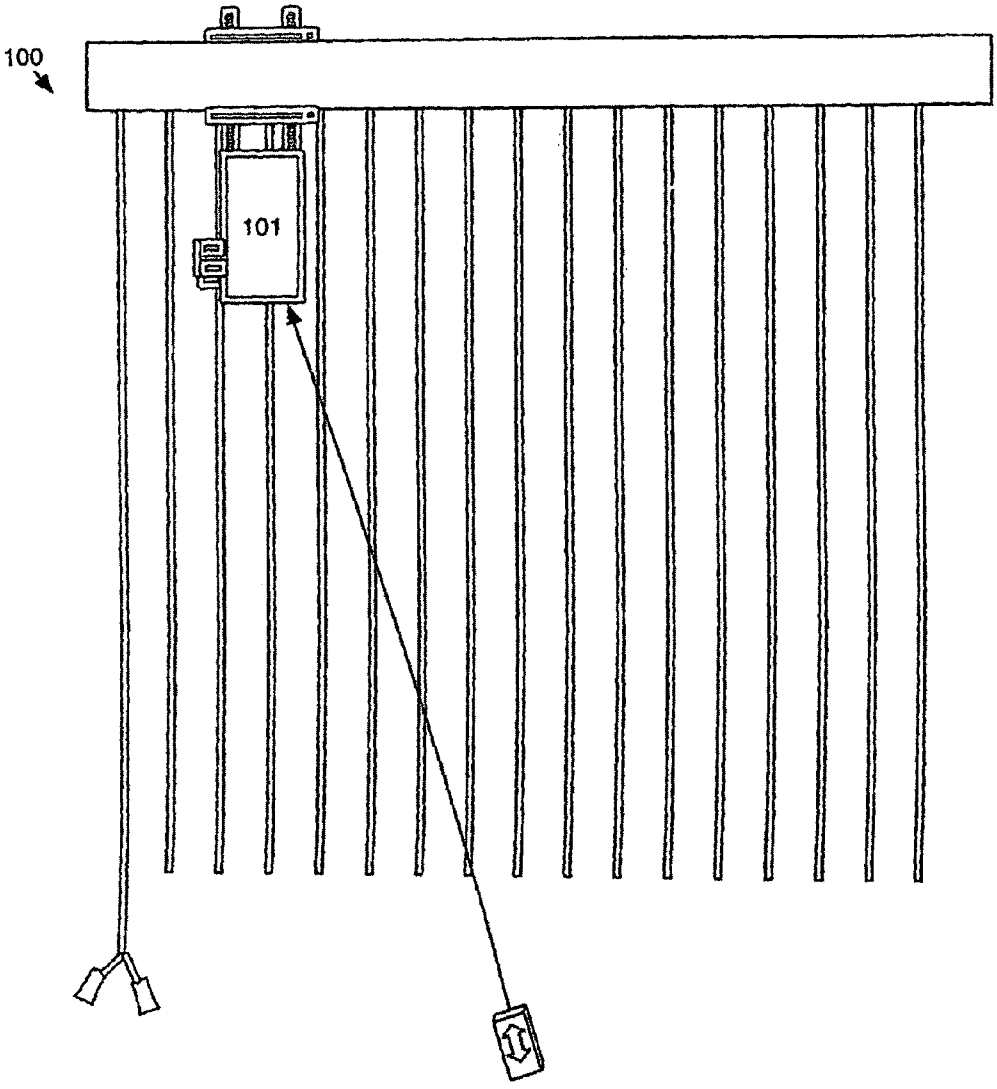
FIG. 1C is a frontal view of a preferred embodiment of the present invention.
Figure 1D:
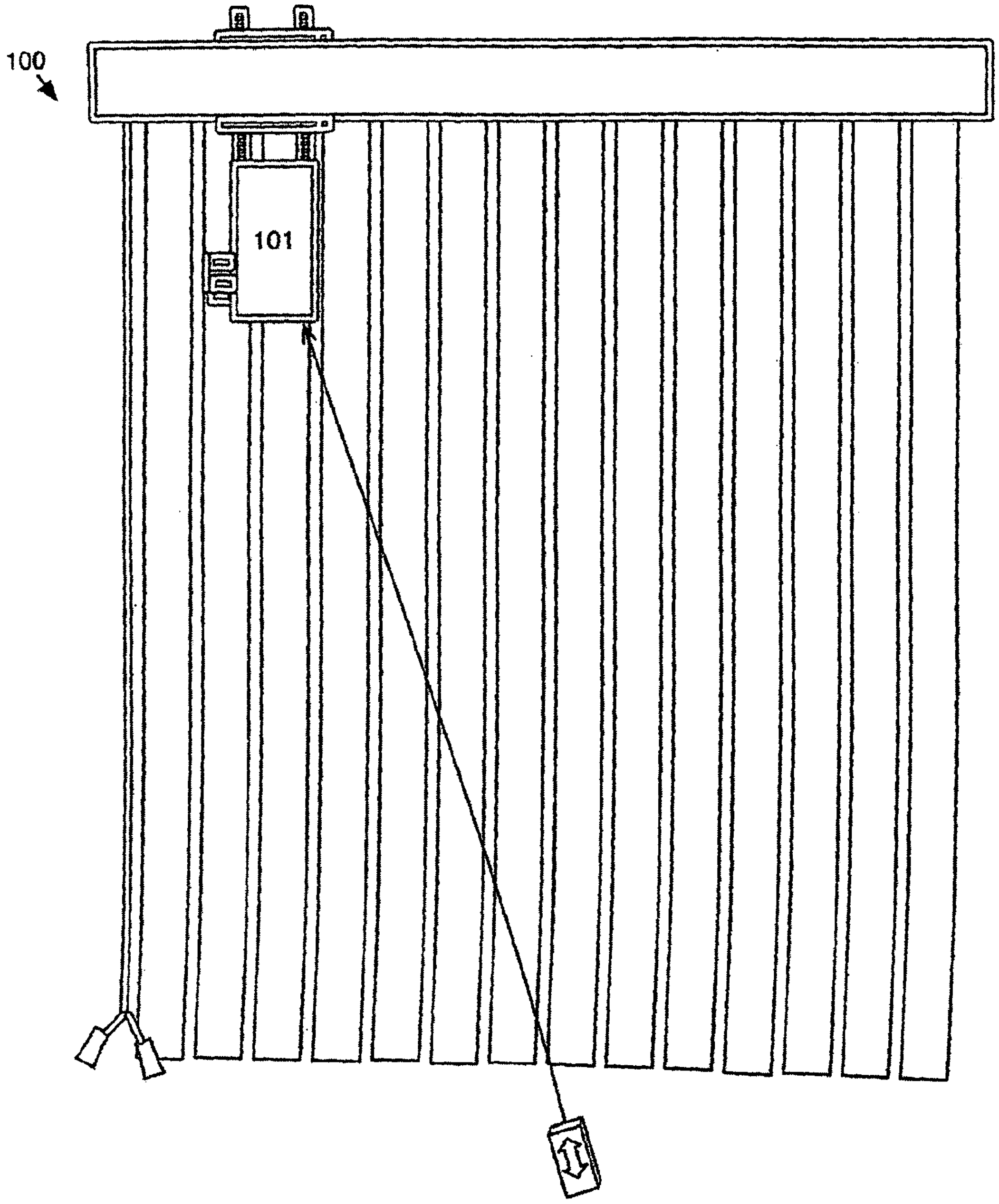
FIG. 1D is a frontal view of a preferred embodiment of the present invention.
Figure 1E:
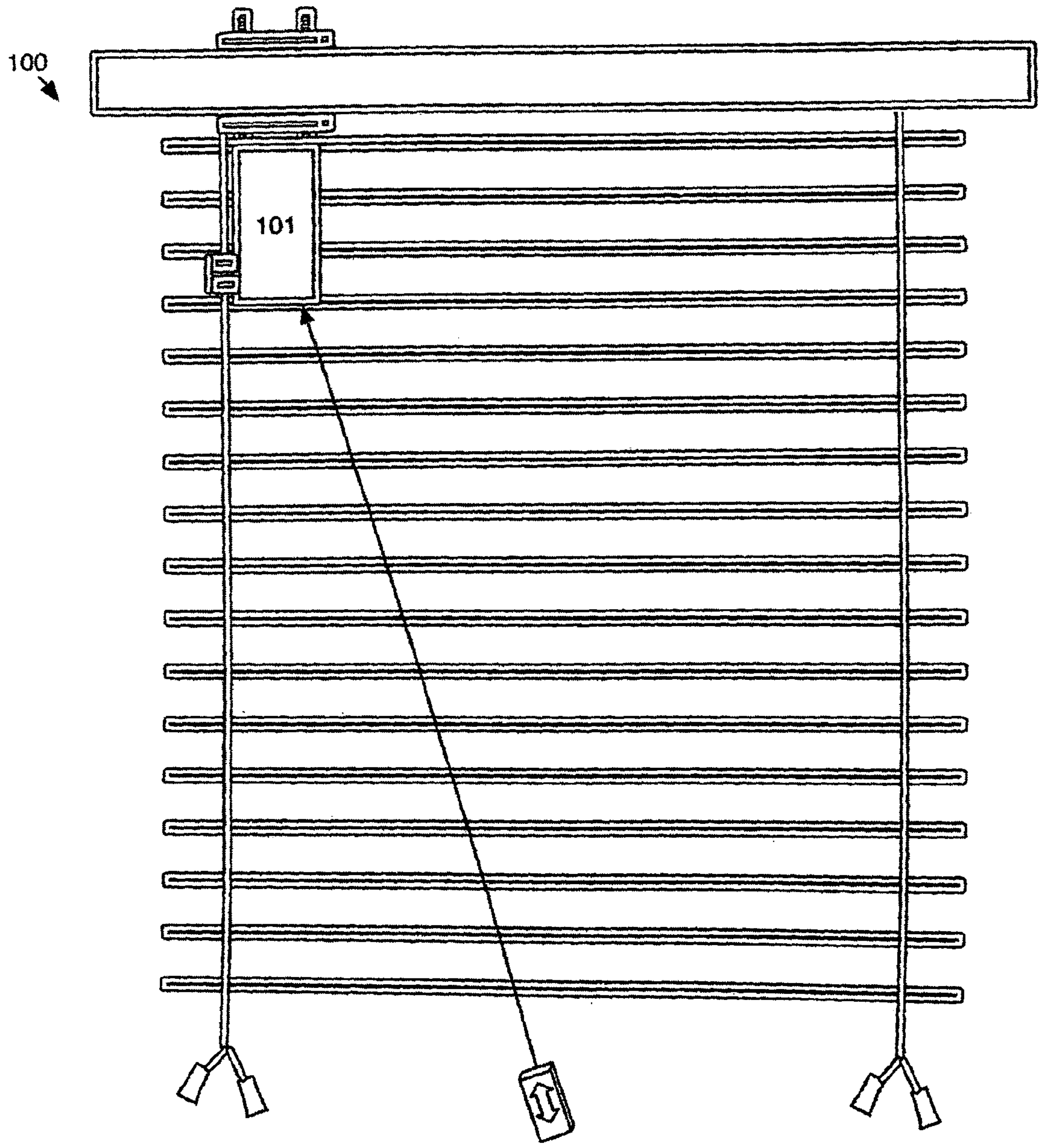
FIG. 1E is a frontal view of a preferred embodiment of the present invention.
Figure 1F:
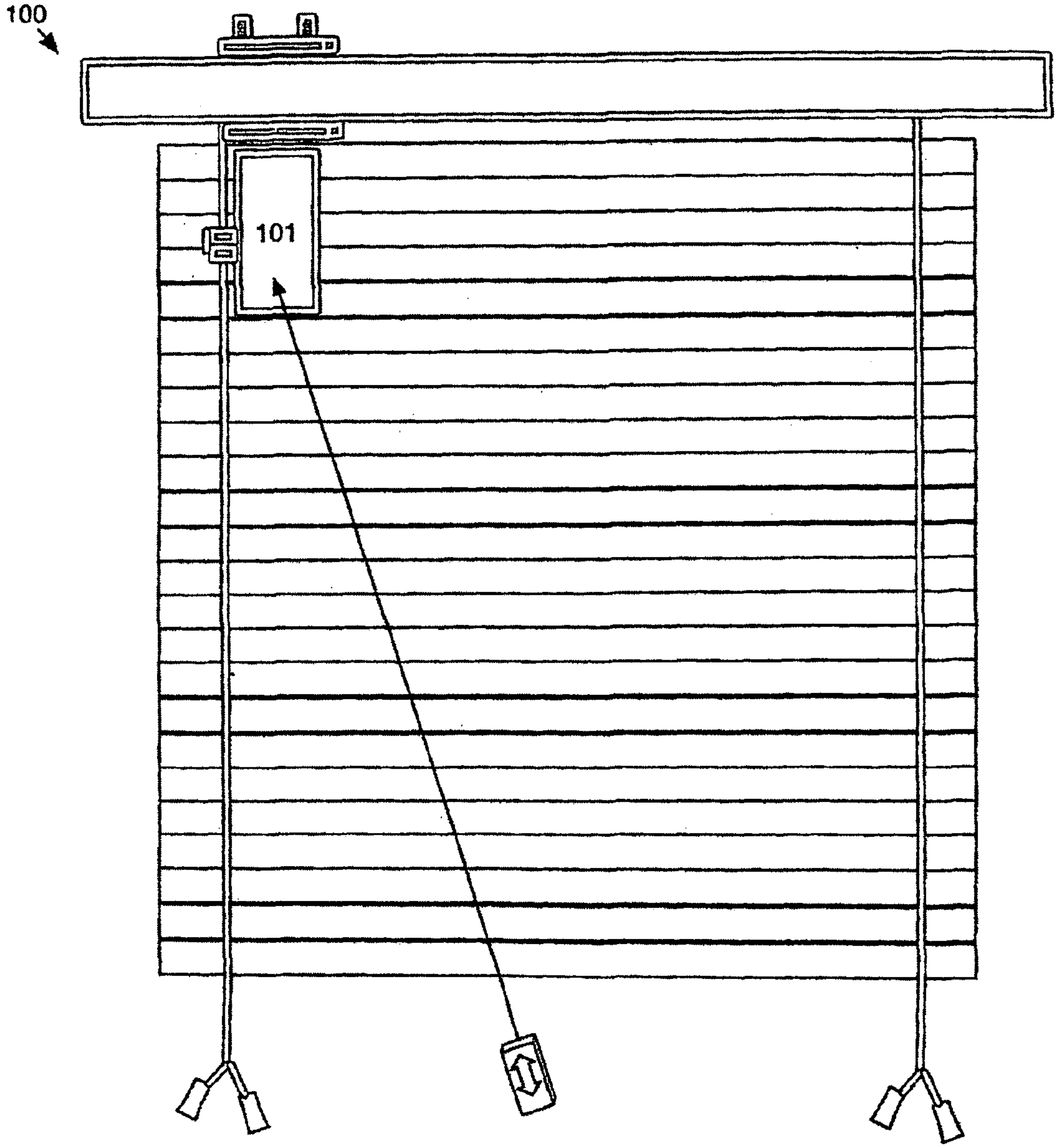
FIG. 1F is a frontal view of a preferred embodiment of the present invention.
Figure 1G:
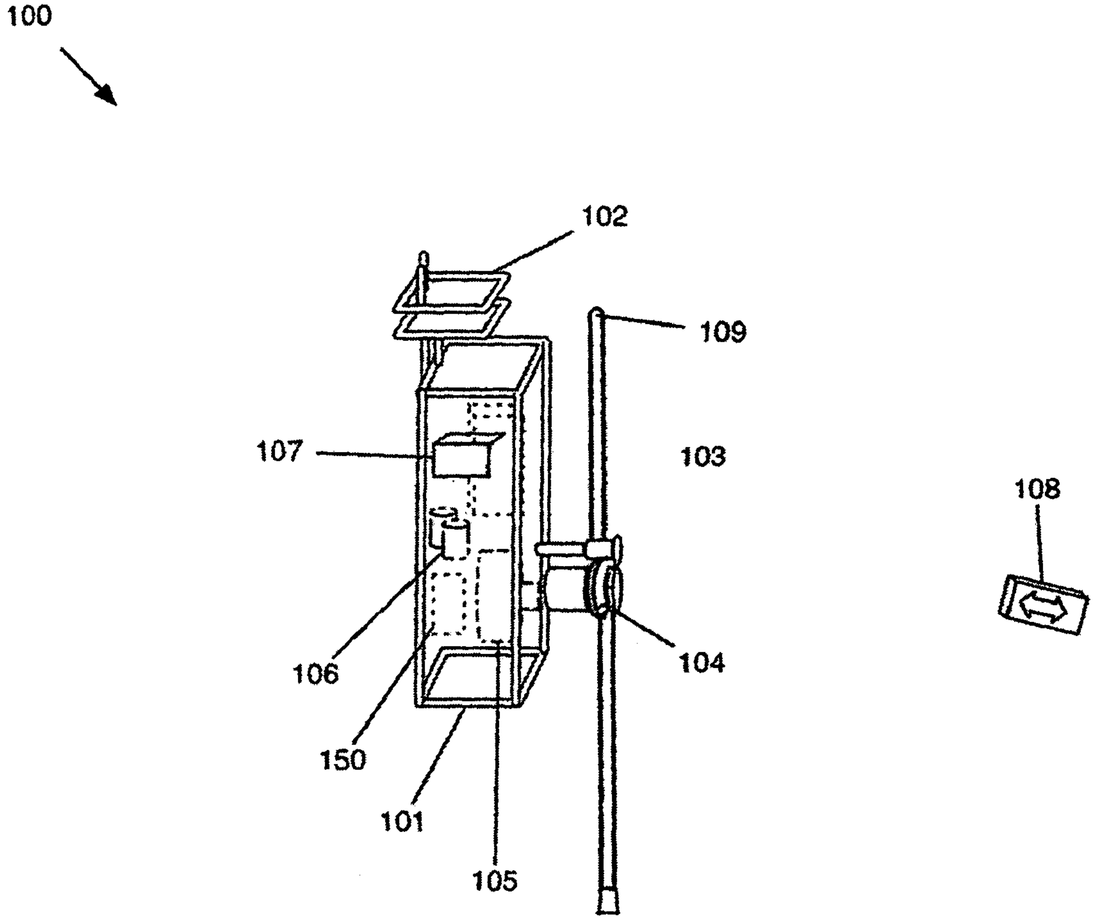
FIG. 1G is a perspective view of a preferred embodiment of the present invention.
Figure 2A:
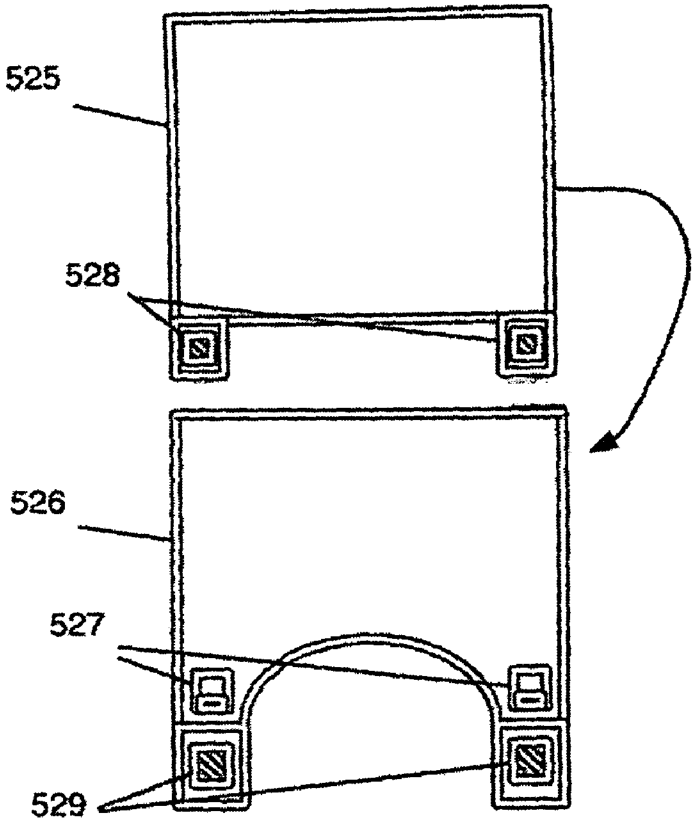
FIG. 2A is a plan view of a preferred embodiment of the present invention.
Figure 2B:
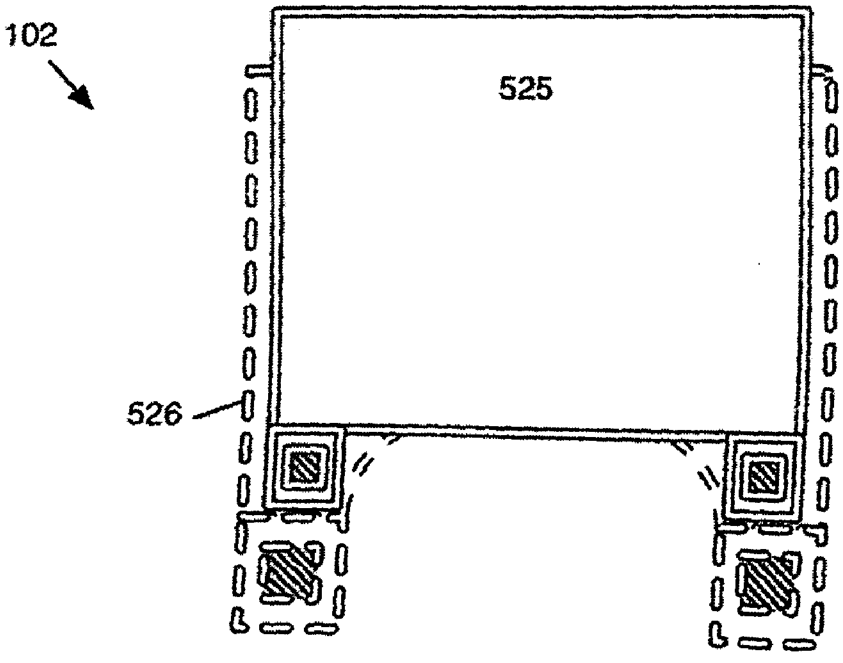
FIG. 2B is a plan view of a preferred embodiment of the present invention.
Figure 2C:
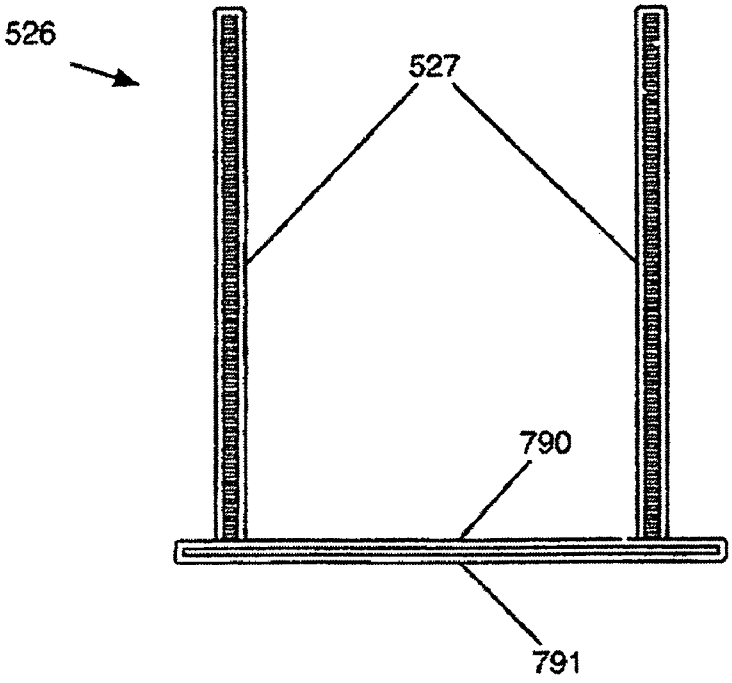
FIG. 2C is a frontal view of a preferred embodiment of the present invention.
Figure 2D:
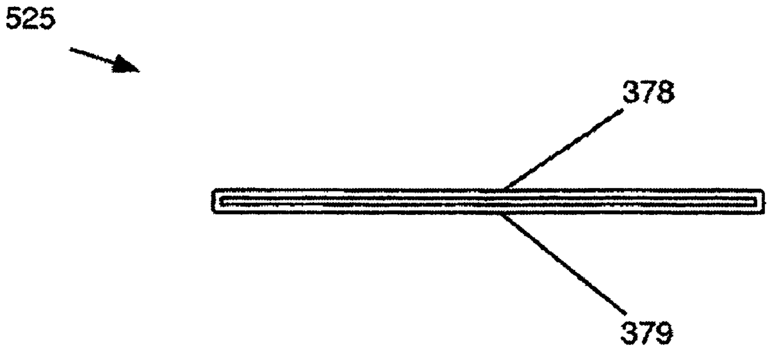
FIG. 2D is a frontal view of a preferred embodiment of the present invention.
Figure 2E:
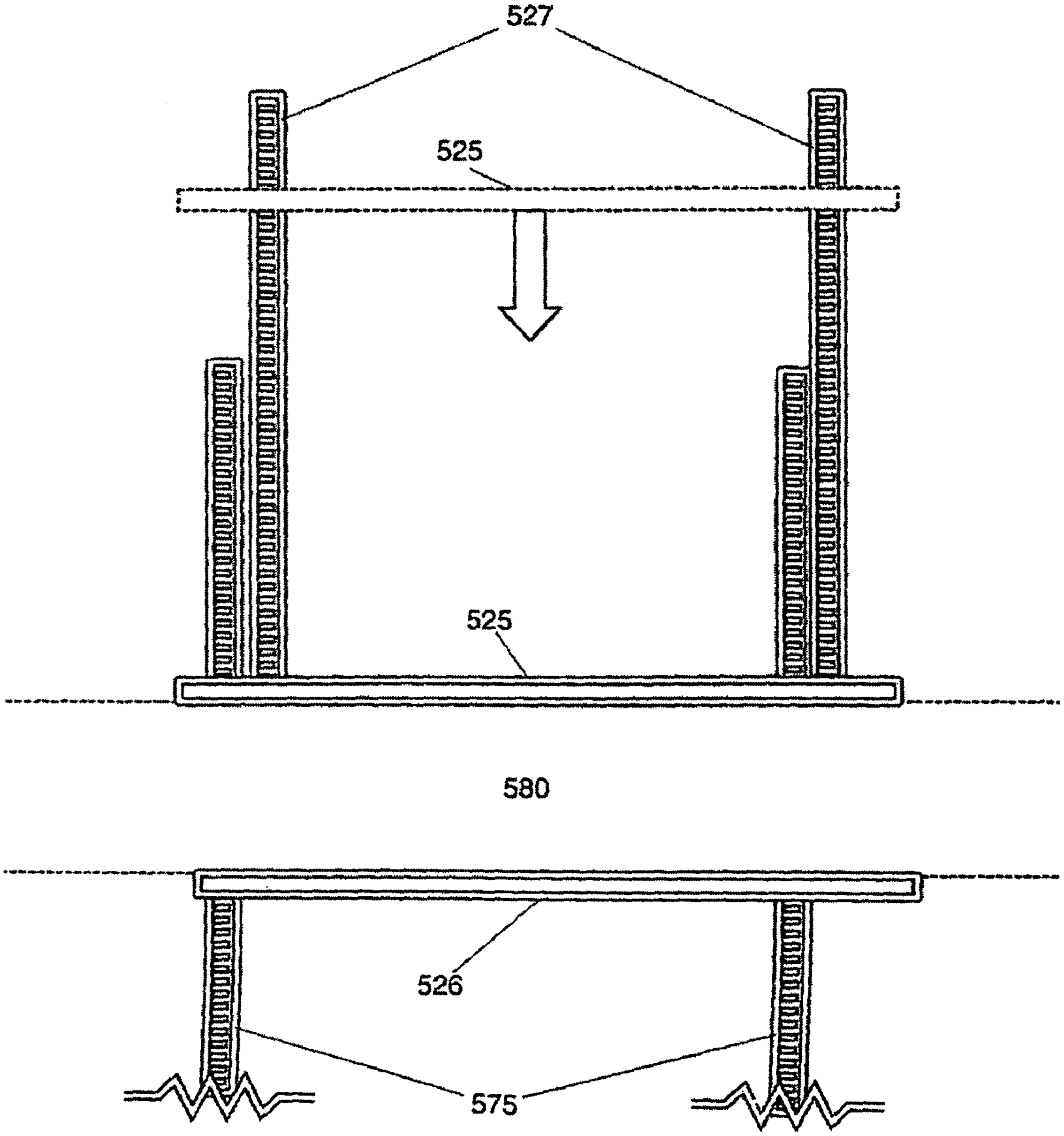
FIG. 2E is a frontal view of a preferred embodiment of the present invention.

According to a preferred embodiment of the present invention, a unique system and apparatus are used to open and close blinds remotely. The present invention is described in enabling detail below.

For the purposes of the present invention the term "blind" or the term "slat" shall hereinafter refer to those individual horizontal members which are rotated by the string of the blind system. Moreover, for the purposes of the present invention the term "vertical mechanism box" refers to the system which integrates the string, the strings (or other analogous parts), and other pieces which enable one to pull up the blinds, let the blinds fall, or to rotate the blinds. In addition, for the purposes of the present invention, the term "valance" shall hereafter refer to the uppermost blind or slat which is typically affixed to the front of the vertical mechanism box.

It should be noted here that the present invention is used for rotationally opening and closing vertical blinds by rotating the slats. The present invention is not intended to be used for the purposes of raising or lowering the slats in a vertical motion.

FIG. 1*a*-1*g* illustrate a preferred embodiment of the present invention. A remote blind actuating system for use in opening and closing blinds with a string comprising a motor 105, a pulley 104, a receiver 107, and a housing 101. In some preferred embodiments the system may further incorporate an attachment assembly 102. And in other preferred embodiments the system may further incorporate a tension member 103.

The motor, the pulley, and the receiver are disposed within the housing. In some preferred embodiments the housing may further incorporate at least one housing zip member 575. The housing zip member is an elongate member which is ribbed on one side for the purpose of securely fastening with a female mating end.

The motor is connected with the pulley and is in communication with the receiver. In some preferred embodiments the system may further comprise a circuit board 150. The circuit board is in communication with the receiver and the motor. Furthermore, the system may further include a battery 106. The battery is in communication with the motor.

FIG. 1*c*-1*f* also illustrates how the system works operationally. A remote control 108 is used to actuate the system from a distance. The remote control may work either through radio waves, laser, infrared, or other expedient means. It may also be possible for the remote control to be physically connected by a wire to the receiver of the system. For these reasons, the type of remote control to be used with the present invention should not be construed to be limiting the scope of the present invention.

It should be noted that the remote control may have an "open" button, a "closed" button, an "up" button, and a "down" button. The open button would actuate the blinds so the blinds are completely open to allow for maximum sunlight to traverse the glass. The closed button would completely close the blinds in order to block out all sunlight. And the up/down buttons would enable the user to choose an intermediate position in between.

Figure 3:
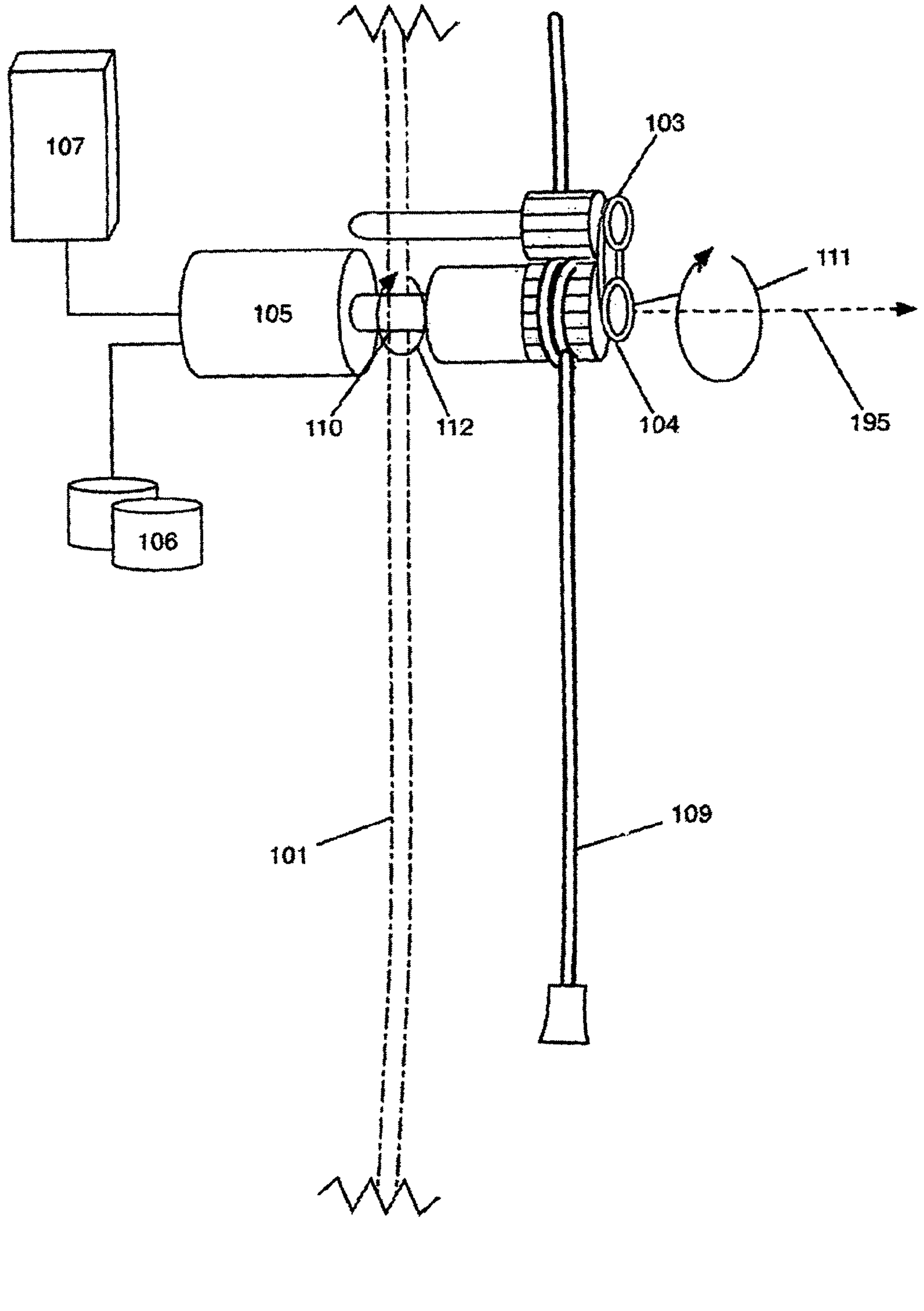
FIG. 3 is a perspective view of a preferred embodiment of the present invention.

FIG. 3 illustrates the principal mechanism by the system operates. The remote control transmits a signal for the system to actuate the blinds to close. The receiver, in turn, actuates the motor. The motor actuates the pulley through the engaging member 110. The pulley, in turn rotationally spins about an axis 111, which is in synchronous relationship with the motor axis 112. The string 109 is vertically engaged through the combined resistance of the rotating pulley and the tension member. The motor can rotate in a clockwise and counter-clockwise fashion in order to either open or close the blinds. It should be noted here that some preferred embodiments may not necessarily incorporate the tension member.

FIGS. 2*a*-2*e* illustrate the attachment assembly 102. The attachment assembly is used for the purpose of affixing the system to the vertical blind apparatus, in particular to the valance 580. The attachment assembly is comprised of a top plate 525 and a bottom plate 526. The top plate is comprised of a planar member with a first side 378 and a bottom side 379. The top plate further comprises at least one receiving orifice 528.

The bottom plate is comprised of a planar member. The bottom plate is comprised of a first plane 790 and a second plane 791. The bottom plate is further comprised of at least one mating orifice 529 and at least one engaging member 527. The engaging member of the bottom plate is sized to fit with the receiving orifice of the top plate. The mating orifice of the bottom plate is sized to mate with the housing zip member 575.

The attachment assembly operates by sandwiching the valance with the top plate and the bottom plate. The top plate and the bottom plate are connected with each other through the engaging member. And the top plate/bottom plate combination are affixed with the housing through the housing zip member which is engaged through the mating orifice of the bottom plate. The housing zip member and the engaging member both have tooth-like grooves which enable for scalability when affixing with various sized valances.

Figure 4:
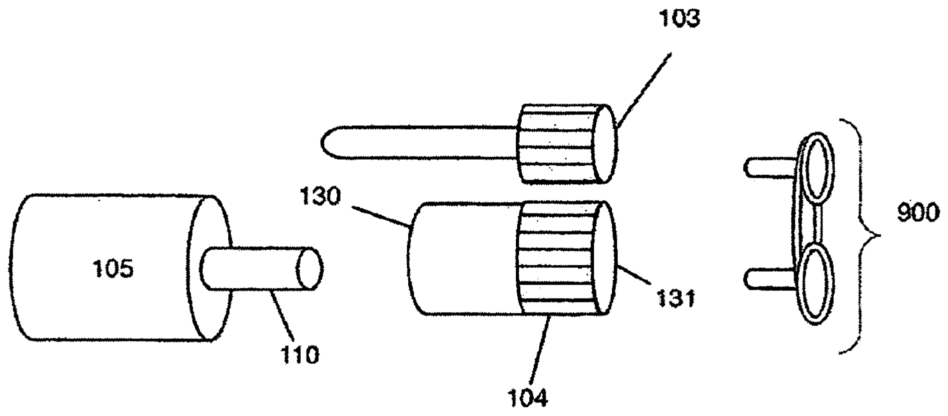
FIG. 4 is a perspective view of a preferred embodiment of the present invention.

FIGS. 3-7 illustrate the means by which the system engages with the string. FIG. 3 illustrates that the motor is engaged with the pulley. The pulley, in turn, is engaged with the string. FIG. 4 illustrates that the pulley is a cylindrical member with a first distal end 130 and a second distal end 131. The pulley is rotatably affixed to the motor about an axis 111. The first distal end of the pulley is connected with the motor and the second distal end is connected with the string. In some preferred embodiments the system may further comprise a connector assembly 900 for the purpose of providing tension between the pulley and the tension member.

The connector assembly comprises a rubber band 901 and two flange members 902, 903. The flange members are affixed with the pulley and tension member respectively. The rubber band is disposed around the two flange members in order to pull the pulley and the tension member against the string to create the necessary resistance in order to actuate the string mechanism which will turn the blinds in the desired direction.

Figure 5:
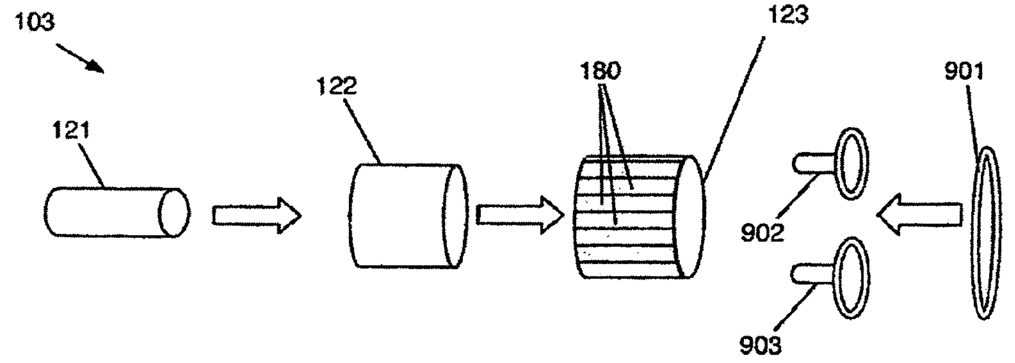
FIG. 5 is a perspective view of a preferred embodiment of the present invention.
Figure 6:
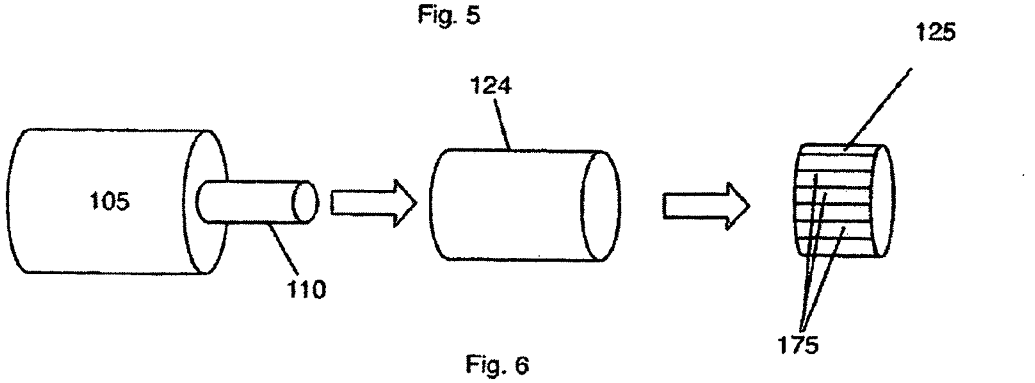
FIG. 6 is a perspective view of a preferred embodiment of the present invention.
Figure 7:
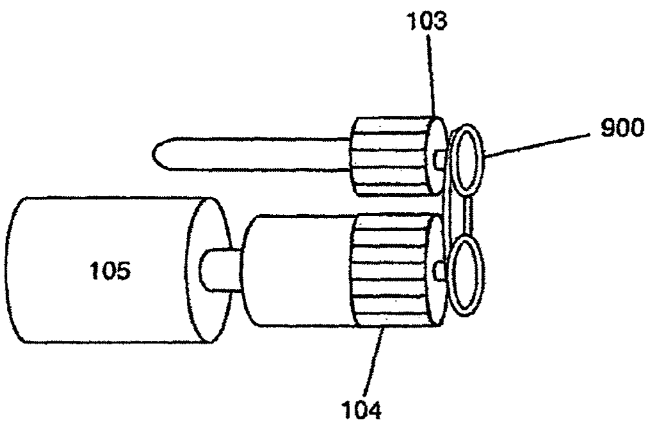
FIG. 7 is a perspective view of a preferred embodiment of the present invention.
Figure 8:
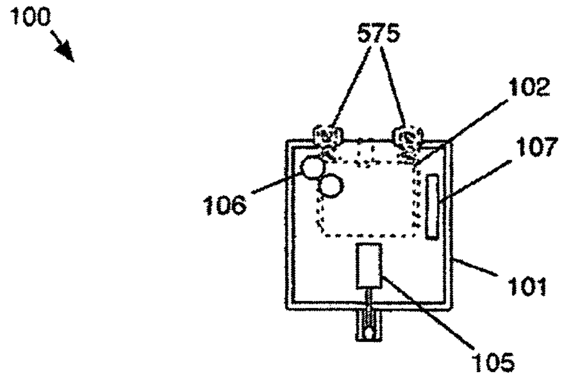
FIG. 8 is a plan view of a preferred embodiment of the present invention.
Figure 9:
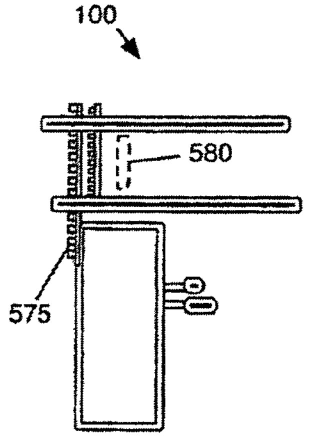
FIG. 9 is a side view of a preferred embodiment of the present invention.
Figure 10:
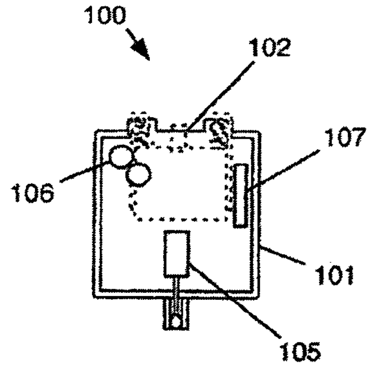
FIG. 10 is a plan view of a preferred embodiment of the present invention.
Figure 11:
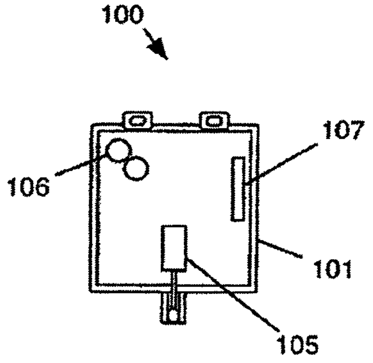
FIG. 11 is a plan view of a preferred embodiment of the present invention.

FIG. 6 illustrates that in some preferred embodiments the pulley may further comprise a pulley gasket 125. The pulley gasket is an elastic sleeve sized to fit around the pulley. The pulley gasket is used for the purpose of providing increased traction between the pulley and the string. Furthermore, in some preferred embodiments the pulley gasket may further comprise a plurality of grooves 175 or tread as illustrated in FIG. 5. The grooves and/or tread is used for the purpose of imparting increased frictional control over the string. The pulley gasket may be comprised of rubber, plastic, or other suitable material expedient for the described purposes and functions.

FIG. 5 illustrates that in some preferred embodiments the system may further include a tension member 103. The tension member is disposed above the pulley. FIG. 3 illustrates how the tension member biases the string against the pulley. The tension member is comprised of a head 122 and a rod 121. The head is affixed to the rod and the rod is affixed to the housing. It should be noted that in some preferred embodiments the rod may be rotatably affixed with the housing such that the whole tension member rotates with the vertical movement of the string. In other preferred embodiments the rod may be rotatably affixed with the head such that only the head rotates with the vertical movement of the string.

FIG. 5 illustrates that the tension member may further comprise a tension gasket 123. The tension gasket is an elastic sleeve sized to fit around the tension member. The tension gasket is used for the purpose of provided increased traction between the tension gasket and the string. This tension gasket may further comprise a plurality of friction channels 180 for the purpose of providing increased traction between the tension member and the string.

It should also be noted that the present invention may also be adaptable for use with various home-macro systems which can modulate various conditions or entertainment devices within the home. In this case the present invention may not necessarily need a remote control, but would instead be either directly wired into the system or would be in communication with the system by radio or other frequency. The options are endless.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A remote blind actuating system for use in opening and closing blinds with a string comprising:

a motor, a pulley, a receiver, an attachment assembly, a pulley gasket, a tension gasket, and a housing;

the motor, the pulley, and the receiver are disposed within the housing;

the motor is connected with the pulley and is in communication with the receiver;

the pulley is an cylindrical member with a first distal end and a second distal end;

the tension gasket is an elastic sleeve sized to fit around the tension member; the tension gasket is used for the purpose of provided increased traction between the tension gasket and the string;

the pulley gasket is an elastic sleeve sized to fit around the pulley; the pulley gasket is used for the purpose of providing increased traction between the pulley and the string;

the pulley gasket comprises a plurality of grooves or tread;

the pulley is rotatably affixed to the motor about an axis;

the attachment assembly comprises a top plate and a bottom plate; the top plate is comprised of a planar member with a first side and a bottom side; the top plate further comprises at least one receiving orifice; the bottom plate is comprised of a first plane and a second plane; the bottom plate is further comprised of at least one mating orifice and at least one engaging member; the engaging member of the bottom plate is sized to fit with the receiving orifice of the top plate; the mating orifice of the bottom plate is sized to mate with the housing zip member the first distal end of the pulley is connected with the motor and the second distal end is connected with the string.

* * * * *